US007650125B2

(12) United States Patent
Wu et al.

(10) Patent No.: US 7,650,125 B2
(45) **Date of Patent: *Jan. 19, 2010**

(54) SYSTEM AND METHOD FOR SAP FM DEMODULATION

(75) Inventors: David Chaohua Wu, San Diego, CA (US); Russ Lambert, Fountain Valley, CA (US)

(73) Assignee: Broadcom Corporation, Irvine, CA (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/286,561

(22) Filed: Nov. 23, 2005

(65) Prior Publication Data

US 2006/0079197 A1 Apr. 13, 2006

Related U.S. Application Data

(63) Continuation of application No. 10/083,076, filed on Feb. 26, 2002, now Pat. No. 7,006,806.

(51) Int. Cl.
*H04B 1/16* (2006.01)

(52) U.S. Cl. ....................... 455/214; 455/337; 455/312; 329/315; 329/336

(58) Field of Classification Search ................. 455/424, 455/425, 456.5, 456.6, 561, 550.1, 575.1, 455/3.06, 312, 214, 42, 45, 309, 188.1, 188.2, 455/334, 263, 345, 351, 337; 348/726, 725, 348/550, 638, 729, 735, 738, 553; 375/321, 375/326, 327, 270, 80, 340, 336, 240.28; 329/315, 357, 306–308, 317, 320, 336, 323, 329/325, 361, 341, 345, 360; 381/2, 3, 27, 381/106, 7

See application file for complete search history.

(56) References Cited

U.S. PATENT DOCUMENTS

| | | | | |
|---|---|---|---|---|
| 4,486,897 | A * | 12/1984 | Nagai | 381/2 |
| 4,628,539 | A * | 12/1986 | Selwa | 455/194.1 |
| 5,404,405 | A * | 4/1995 | Collier et al. | 381/7 |
| 6,356,598 | B1 * | 3/2002 | Wang | 375/321 |
| 6,512,555 | B1 * | 1/2003 | Patel et al. | 348/726 |
| 6,542,203 | B1 * | 4/2003 | Shadwell et al. | 348/726 |
| 6,707,861 | B1 * | 3/2004 | Stewart | 375/321 |
| 6,760,076 | B2 * | 7/2004 | Wittig | 348/500 |
| 6,771,707 | B1 * | 8/2004 | Limberg | 375/270 |
| 6,810,084 | B1 * | 10/2004 | Jun et al. | 375/240.28 |
| 6,879,647 | B1 * | 4/2005 | Myers | 375/336 |
| 6,937,671 | B2 * | 8/2005 | Samarasooriya | 375/326 |
| 6,972,632 | B2 * | 12/2005 | Akahori | 331/10 |
| 7,098,967 | B2 * | 8/2006 | Kanno et al. | 348/726 |

(Continued)

*Primary Examiner*—Duc Nguyen
*Assistant Examiner*—Charles Chow
(74) *Attorney, Agent, or Firm*—McAndrews, Held & Malloy, Ltd.

(57) ABSTRACT

Certain embodiments of the present invention provides a system and method for SAP FM demodulation. The system includes a bandpass filter for isolating the SAP signal, a Hilbert filter to produce a copy of the SAP signal phase shifted by 90 degrees, an FM demodulator for demodulating the SAP signal using the phase shifted SAP signal and a delayed SAP signal, and a lowpass filter to eliminate noise from the FM demodulated SAP signal. The system may also include an automatic gain control for normalizing amplitude of FM demodulator input signals. The digital FM demodulator uses a simplified approximation using non-unity delay for simplified demodulation of frequency modulated signals.

21 Claims, 3 Drawing Sheets

300
310 Transmit composite signal to BPF.
320 Filter signal to obtain SAP.
330 Transmit SAP signal to delay and Hilbert filter.
350 Delay signal.
340 Hilbert filter for quadrature signal.
360 Transmit delayed and Hilbert filtered signals to FM demodulator.
370 FM demodulate the SAP signal.
380 Transmit composite signal to LPF.
390 Eliminate noise to produce FM demodulated signal.

U.S. PATENT DOCUMENTS 7,119,856 B2 * 10/2006 Huang et al. ................ 348/725
7,167,215 B2 * 1/2007 Markman et al. ........... 348/726
7,272,197 B2 * 9/2007 Hwang ....................... 375/326
7,403,579 B2 * 7/2008 Jaffe et al. .................. 375/326

* cited by examiner

SYSTEM AND METHOD FOR SAP FM DEMODULATION

RELATED APPLICATIONS

This application is a continuation of non-provisional application Ser. No. 10/083,076, filed Feb. 26, 2002, now U.S. Pat. No. 7,006,806, which is hereby incorporated herein by reference in its entirety.

BACKGROUND OF THE INVENTION

Certain embodiments of the present invention generally relate to a second audio program (SAP) channel, and in particular, relate to demodulation of a frequency modulation (FM) SAP channel.

Many television programs are enjoyed by audiences speaking a variety of different languages. Therefore, it is desirable to provide audio content in multiple languages along with video content. Additional audio content is typically easier to encode and transmit than video content, so allowing transmission of multiple audio streams with a single video stream may reduce bandwidth and system complexity requirements.

Additionally, information may be provided to supplement an audio or audiovisual program. For example, advertisements or promotions related to a television program may be attractive to viewers. Also, customers may enjoy listening to local radio stations through their television sets or may enjoy receiving current weather or traffic reports along with regular television programming.

SAP channels may be used in audio communications, such as television or radio, for example, to provide a separate audio source in addition to left and right stereo signals or a monoaural audio signal. An SAP channel may be used to duplicate audio content contained on other audio channels or may carry additional information, such as audio content in a second language, descriptive information regarding the audio content, advertising material, local radio stations, weather or traffic reports, frequency-shift keying information, or other additional material unrelated to the main audio content.

During the 1980s, the Federal Communications Commission (FCC) adopted the format established by the Broadcast Television Standards Committee (BTSC) as a standard for multichannel television sound (MTS). Typically, the BTSC format is used with a composite TV signal that includes a video signal, as well as the BTSC format for sound reproduction.

The BTSC format is similar to FM stereo, but has the ability to carry two additional audio channels. Left plus right channel mono information is transmitted in a way similar to stereo FM in order to ensure compatibility with monaural television receivers. A 15.734 kHz pilot signal is used, instead of the FM stereo 19 kHz pilot signal, which allows the pilot signal to be phase-locked to the horizontal line frequency. A double sideband-suppressed carrier at twice the frequency of the pilot transmits the left minus right stereo information. The stereo information may be DBX encoded to aid in noise reduction. An SAP channel is located at 5 times the pilot frequency. The SAP channel may be used for second language or independent source program material. A professional audio channel may be added at 6.5 times the plot frequency in order to accommodate additional voice or data.

Stereo tuners and demodulator units capable of decoding the BTSC format have been on the market for some time. The front end of the units typically includes analog components or integrated circuit chips that cause variation in the amplitude of the composite signal, including the BTSC portion of the signal. This variation in amplitude reduces stereo separation of the right and left channel information carried in the composite signal. Additionally, current stereo tuners and demodulator units attempt to separate an SAP channel using an unnecessarily complicated process with significant hardware cost.

Further limitations and disadvantages of conventional and traditional approaches will become apparent to one of skill in the art, through comparison of such systems with embodiments of the present invention as set forth in the remainder of the present application with reference to the drawings.

It is desirable to perform BTSC decoding in the digital domain on a block of an ASIC chip such that the implementation is optimized for reduced complexity and cost. By reducing the complexity, fewer clock cycles are required for processing, and power consumption is also reduced.

Thus, there is a need for a system that isolates and demodulates an SAP channel without unnecessary noise or variation. Also, there is a need for a simplified and efficient method of demodulating an SAP channel. There is a further need for a system that demodulates an SAP channel of an audio communication without excess hardware. There is a need for a system that utilizes an efficient approximation of the digital FM demodulation equation.

BRIEF SUMMARY OF THE INVENTION

Certain embodiments of the present invention provides a system and method for SAP FM demodulation. Certain embodiments of the present invention provide a digital FM demodulator that uses a simplified approximation of a digital FM demodulation equation using non-unity delay for simplified demodulation of frequency modulated signals. The system includes a bandpass filter for isolating the SAP signal, a Hilbert filter to produce a copy of the SAP signal phase shifted by 90 degrees, an FM demodulator for demodulating the SAP signal using the phase shifted SAP signal and a delayed SAP signal, and a lowpass filter to eliminate noise from the FM demodulated SAP signal. The system may also include an automatic gain control for normalizing amplitude of FM demodulator input signals. The FM demodulator uses a simplified approximation for easy demodulation of SAP signals. A simplified equation that may be used is $I(n)*Q(n-d)-Q(n)*I(n-d)$, wherein $I(n)$ represents the delayed copy of the SAP information, $Q(n)$ represents the copy of the SAP information with a phase shift, d represents a delay greater than one, and n represents a discrete time index.

The method includes isolating desired signal information from an audio signal. Then, the method includes phase shifting a copy of the desired signal information from an audio signal and delaying a copy of the desired signal information. The method further includes FM demodulating the desired signal information using the phase shifted copy of the desired signal information and the delayed copy of the desired signal information to produce an FM demodulated signal.

Certain embodiments also provide a method for simplification of secondary audio program signal demodulation. The method includes using a bandpass filter with a minimal number of coefficients to isolate the secondary audio program signal in a composite audio signal, using a Hilbert filter with a minimal number of coefficients to produce a signal in quadrature phase, and using a simple approximation for FM demodulation of the secondary audio program signal and the signal in quadrature phase.

DETAILED DESCRIPTION OF THE INVENTION

Figure 1:
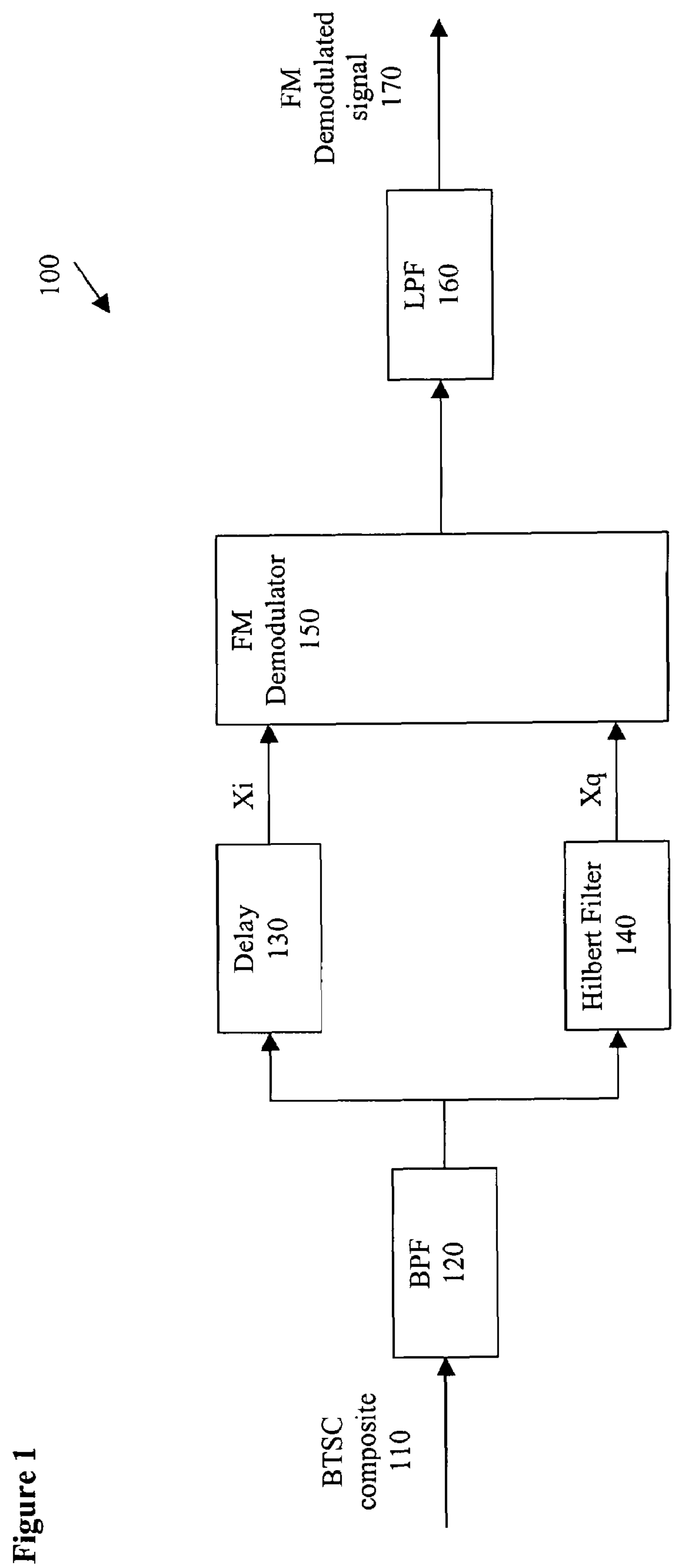
FIG. 1 illustrates a SAP demodulation system, formed in accordance with an embodiment of the present invention.

FIG. 1 illustrates a SAP demodulation system 100, formed in accordance with an embodiment of the present invention. The SAP demodulation system 100 includes a BTSC composite audio signal 110, a bandpass filter (BPF) 120, a delay module 130, a Hilbert filter 140, an FM demodulator 150, and a low pass filter (LPF) 160. The output is an FM demodulated signal 170. The system 100 may be used to demodulate digital FM signals, but, for the purposes of illustration, the system 100 will be described in relation to SAP signal demodulation.

The BTSC composite audio signal 110 feeds into the BPF 120. After passing through the BPF 120, a filtered signal representing the SAP channel travels to both the delay module 130 and the Hilbert filter 140. The delay module 130 produces a signal Xi that is sent to the FM demodulator 150. The Hilbert filter 140 produces a signal Xq that is sent to the FM demodulator 150. A signal from the FM demodulator 150 enters the LPF 160. The FM demodulated signal 170 is generated from the LPF 160.

Figure 2:
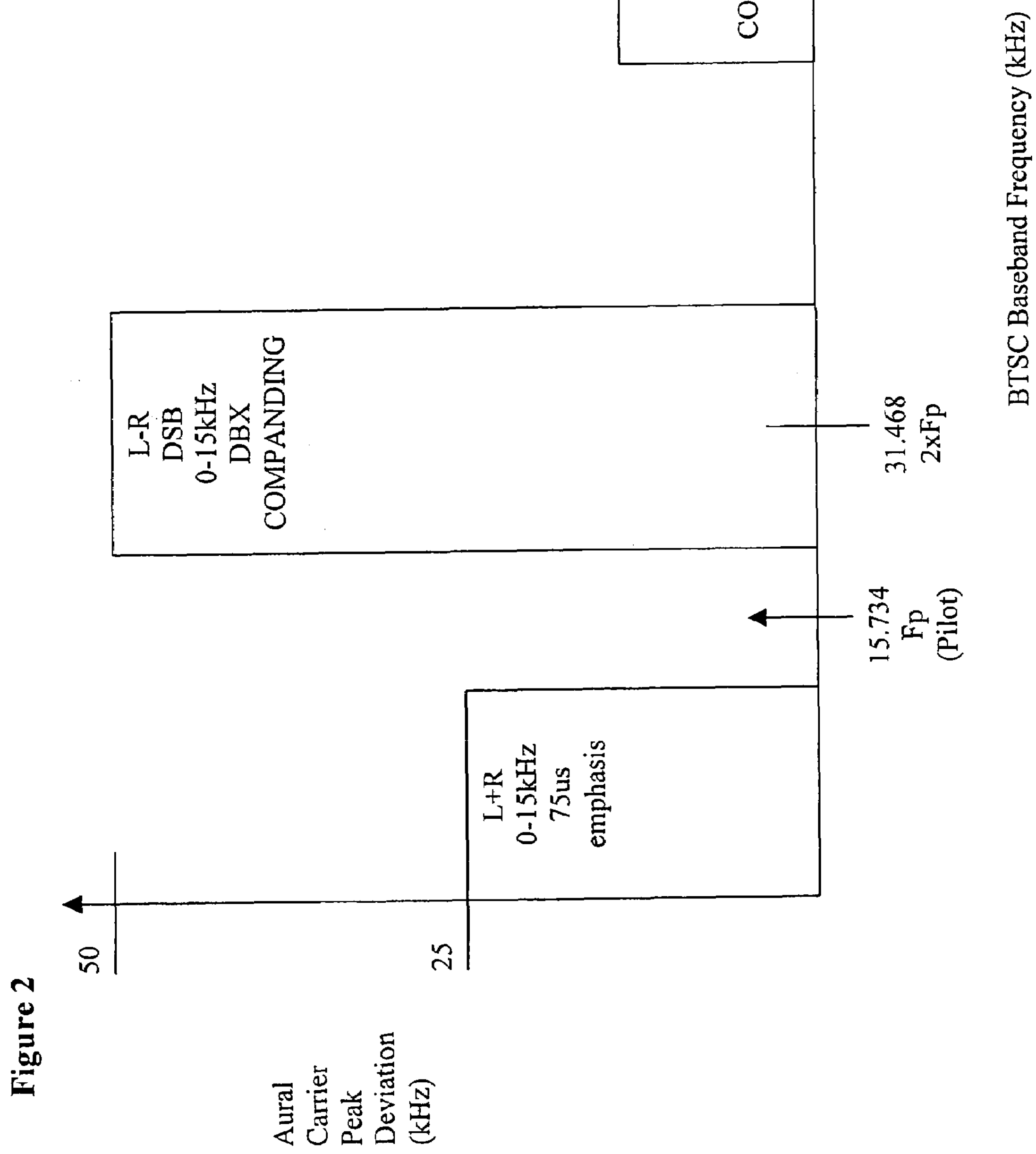
FIG. 2 illustrates a BTSC baseband frequency in accordance with an embodiment of the present invention.

In one embodiment, the BTSC composite audio signal 110 is similar to FM stereo but has the ability to carry two additional audio channels. Left plus right (L+R) channel mono information may be transmitted in a way similar to stereo FM in order to ensure compatibility with monaural television receivers. A 15.734 kHz pilot signal may be used, instead of the FM stereo 19 kHz pilot signal, which allows the pilot signal to be phase-locked to the horizontal line frequency. A double sideband-suppressed carrier, at twice the frequency of the pilot, transmits the left minus right (L−R) stereo information. The stereo information may be DBX encoded to aid in noise reduction. An SAP channel may be located at 5 times the pilot frequency. The SAP channel may be used for second language, advertising, supplement information, or independent source program material, for example. A professional audio channel may be added at 6.5 times the pilot frequency in order to accommodate additional voice or data. FIG. 2 illustrates a BTSC baseband frequency in accordance with an embodiment of the present invention.

The BPF 120 passes a range of frequencies between low and high cut-off frequencies. The BPF 120 may be used to remove stereo and professional audio channels. In one embodiment, the BPF 120 may be a finite impulse response (FIR) filter. A FIR filter generates a response based on an input impulse. The impulse is finite because it does not produce feedback in the filter. The FIR filter receives an input signal and produces a set of coefficients. The input signal and the coefficients form the output signal. Delay may be introduced as the input signal moves past the coefficients. A “tap” of a FIR filter is a coefficient/delay pair. The number of FIR filter taps may relate to the amount of memory in the filter, the scope of the filtering, and the number of calculations involved in the filtering. Thus, fewer taps may indicate fewer calculations and less memory for filtering a signal. The BPF 120 uses a minimal number of taps to isolate the SAP signal. In one embodiment, the BPF 120 is 32-tap FIR bandpass filter. The 32-tap FIR filter reduces the number of calculations involved in filtering the SAP channel from the composite audio signal 110. The 32-tap FIR filter also reduces the hardware and memory used in filtering the audio signal 110 to obtain the SAP channel.

The Hilbert filter 140 is a filter used to derive a signal in phase quadrature. Signals in phase quadrature have a 90 degree phase difference. The Hilbert filter 140 receives an input signal and produces output with the same frequency response as the input but with a 90 degree phase difference. The Hilbert filter 140 may be a FIR filter or an infinite impulse response (IIR) filter, for example. An IIR filter uses feedback, while an FIR filter does not use feedback. In one embodiment, the Hilbert filter 140 is an 11-tap frequency-domain Remez-designed Hilbert filter.

The delay module 130 delays the SAP channel signal as a copy of the SAP channel is filtered by the Hilbert filter 140. The delayed signal is used with the phase quadrature signal from the Hilbert filter 140 in the FM demodulator 150. The delay introduced by the delay module 130 may be a delay d, preferably greater than 1 (non-unity delay).

The FM demodulator 150 combines the delayed SAP signal from the delay module 130 and the signal in phase quadrature from the Hilbert filter 140 to produce an FM demodulated signal. In one embodiment, the FM demodulator 150 uses a four times (4×) sampling rate. The FM demodulator 150 uses a simplified demodulation equation $m(n) \approx I(n)*Q(n-d)-Q(n)*I(n-d)$ as an approximation to demodulate the signal, where d is a delay greater than 1. In one embodiment, the delay d is 2, yielding the equation $m(n) \approx I(n)*Q(n-2)-Q(n)*I(n-2)$. The simplified demodulation equation may also be used for FM demodulation of other digital signals, such as Bluetooth™ digital communication signals and other digital audio signals, for example.

The LPF 160 passes only low frequencies up to a set cut-off frequency. The LPF 160 is used to remove noise that is out of the desired frequency band from the demodulated signal. In one embodiment, the LPF 160 is a $4^{th}$ order elliptical LPF.

In operation, the composite signal 110 is transmitted to the BPF 120. As shown in FIG. 2, within the composite signal 110, the SAP signal is centered at five times the pilot signal 25 at a frequency of 78.67 kHz. In order to demodulate this part of the composite audio signal 110, the BPF 120 is applied to the signal 110 to remove the L+R and L−R stereo channels, as well as the professional channel if the professional channel is present in the composite signal 110. Then, the bandpass filtered signal is fed into a Hilbert filter 140 to generate a signal in phase quadrature and is also fed into the delay module 130 to delay the bandpass filtered signal. The delayed signal and signal in phase quadrature are then transmitted to the FM demodulator 150. The FM demodulator 150 applies a simplified demodulation equation to generate a demodulated SAP signal. The demodulated SAP signal is transferred to the LPF 160 to clean up the signal and remove noise outside the desired SAP band. The LPF 160 produces the FM demodulated signal 170.

In current systems, the FM carrier amplitude at the FM demodulator 150 is not a known constant. In one embodiment, the FM carrier amplitude is adjusted with an automatic gain control (AGC) module (not pictured). In one embodiment, the AGC module includes a comparator and a scaling factor generator. The FM carrier amplitude is normalized and compared with a programmable reference value. Then, the controlling scaling factor either increments or decrements the FM carrier signal from the normalized value based on the comparator results which are either larger than or less than the reference value.

Figure 3:
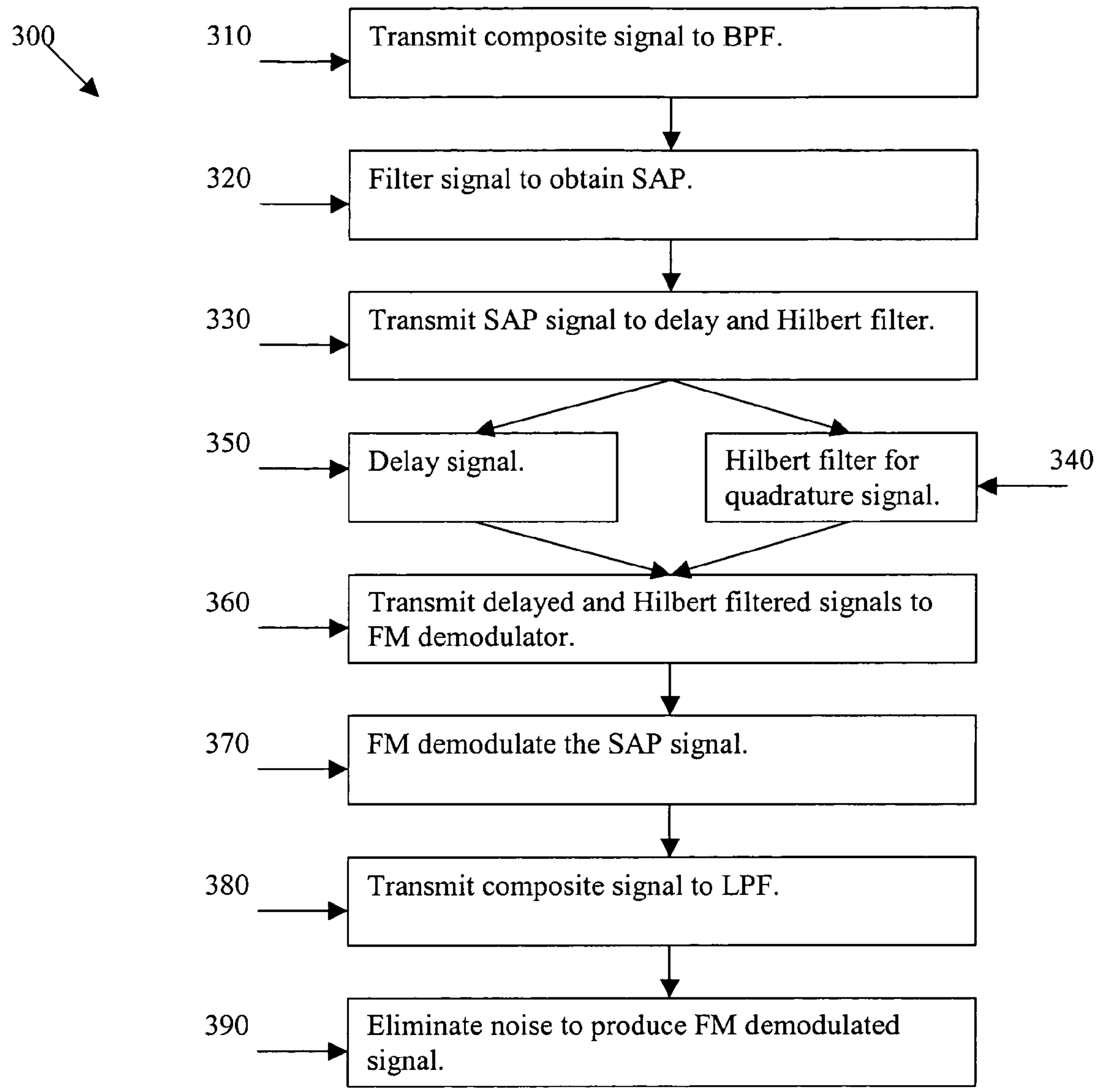
FIG. 3 illustrates a flow diagram for a method of FM demodulating an SAP signal in accordance with an embodiment of the present invention.

FIG. 3 illustrates a flow diagram for a method of FM demodulating an SAP signal in accordance with an embodiment of the present invention. First, at step 310, a BTSC composite signal 110 is transmitted to the BPF 120. Then, at step 320, the bandpass filter removes the stereo components, such as L+R, L−R, L, R, or professional channel, for example, to isolate the secondary audio program signal.

Next, at step 330, the SAP signal is sent to both the delay module 130 and the Hilbert filter 140. At step 340, the Hilbert filter is applied to the SAP signal to produce a phase quadrature signal, with a 90 degree difference in phase from the input signal. The output signal from the Hilbert filter 140 is signal Xq, represented by the following equation:

$$Xq(t)=\sin[2\pi f_c t+2\pi f_c M(t)], \tag{1}$$

wherein $f_c$ represents the FM carrier frequency, t represents time, and M(t) represents the desired signal information.

Also, at step 350, the SAP signal is delayed by the delay module 130. The delay produces signal Xi, represented by the following equation:

$$Xi(t)=\cos[2\pi f_c t+{}^t\int m(t)dt]=\cos[2\pi f_c M(t)]. \tag{2}$$

Thus, Xq and Xi are separated by 90 degrees.

Then, at step 360, the delayed and phase quadrature signals are transmitted to the FM demodulator 150. If the FM carrier amplitude is not a constant, the FM carrier amplitude may be adjusted using automatic gain correction to normalize the amplitude and adjusted based on a comparison with a reference value. Then, at step 370, the SAP signal is demodulated using the delayed signal Xi and the quadrature signal Xq. The FM demodulator 150 uses the simplified demodulation equation:

$$m(n)\approx I(n)*Q(n-d)-Q(n)*I(n-d), \tag{3}$$

wherein I(n) represents the delayed signal Xi, Q(n) represents the quadrature phase signal Xq, d represents the non-unity delay, and n represents a discrete time index. The simplified demodulation equation is obtained from the more detailed demodulation equation based on Xq and Xi. The original equation is:

$$m_d(t)=[\{x_i(t)\}'x_q(t)-x_i(t)\{x_q(t)\}']/[\{x_i(t)\}^2+\{x_q(t)\}^2]. \tag{4}$$

Thus, the simplified FM demodulation approximation of Xi and Xq is:

$$m(n)\approx(x_i(n)x_q(n-d)-x_q(n)x_i(n-d)). \tag{5}$$

Further detail on the use of the general delay d and the approximation is provided below.

Next, at step 380, the demodulated SAP signal is transmitted to the LPF 160. Finally, at step 390, the LPF 160 filters the demodulated signal to remove noise outside the range of the SAP signal. The resulting signal is the FM demodulated signal 180. The FM demodulated signal 180 is in digital form and may be used in televisions, radios, or other such devices.

Common digital approximations utilize a delay of one. Certain embodiments of the present invention employ a non-unity delay of greater than one. A general delay d, greater than one, may allow simplified FM demodulation of a variety of digital signals, such as SAP signals, Bluetooth™ communication signals, and other digital audio signals. The following equations illustrate the use of a general delay d. In the equations, m(n) represents an original message sequence, such as speech, music, program material, or data, for example. M(n) represents the original message sequence integrated modulo 2*pi. Also, $\tilde{m}(n)$ represents a scaled approximate message signal received using an approximate and efficient digital demodulation equation. I(n) and Q(n) are the in-phase and quadrature parts of the received FM modulated signal. In the equations, d is a delay used in the approximate demodulation equation (a non-negative integer), n is a discrete time index, $f_c$ is a carrier frequency, $F_s$ is a sampling frequency, and $f_{dev}$ is a frequency deviation of the FM modulation.

$$\begin{aligned}
\tilde{m}(n) &= I(n)*Q(n-d)-I(n-d)*Q(n)\\
&= \cos\left(2\pi\frac{f_c}{F_s}n+M(n)\right)\sin\left(2\pi\frac{f_c}{F_s}(n-d)+M(n-d)\right)-\\
&\quad \sin\left(2\pi\frac{f_c}{F_s}n+M(n)\right)\cos\left(2\pi\frac{f_c}{F_s}(n-d)+M(n-d)\right)\\
&= -\sin\left(2\pi\frac{f_c}{F_s}(d)+M(n)-M(n-d)\right)\\
&= -\sin(M(n)-M(n-d))\cos\left(2\pi\frac{f_c}{F_s}d\right)+\\
&\quad \cos((M(n)-M(n-d))\sin\left(2\pi\frac{f_c}{F_s}d\right)
\end{aligned}$$

$$\begin{aligned}
&\text{Example: } (d=2,\ Fs=4*f_c)\\
&= \sin(M(n)-M(n-2))\approx M(n)-M(n-2)=4\pi f_{dev}*m(n)
\end{aligned}$$

Further details regarding the use of SAP and stereo signals or an example of how FM demodulation of an SAP channel fits in with a BTSC decoder may be found in the application entitled "System and Method of Performing Sample Rate Conversion of a Multi-Channel Audio Signal" filed on the same day as the application herein was filed, in the application entitled "System and Method of Performing Analog Multi-Channel Audio Signal Amplitude Correction" filed on the same day as the application herein was filed, in the application "Pilot Tone Based Automatic Gain Control System and Method" filed on the same day as the application herein was filed, and in the application "System and Method of Performing Digital Multi-Channel Audio Signal Decoding" filed on the same day as the application herein was filed.

In summary, certain embodiments of the present invention use minimal hardware and minimal equations to isolated and demodulate secondary audio program data included in a BTSC composite audio signal. The use of a simplified equation reduces the complexity of the process and also reduces the amount of hardware and memory involved in demodulation. Using a minimal number of filter taps also may reduce hardware complexity. Certain embodiments may improve the speed of the demodulation, as well as reduce the size, complexity, and cost of hardware. As a result, certain embodiments of the present invention afford an approach to achieve efficient, low cost, low power, digital audio signal decoding of frequency modulated information, such as SAP information, from digital signals, such as BTSC audio signals, in the digital domain.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for demodulation of secondary audio program information, said system comprising:

a bandpass filter for isolating said secondary audio program information from a composite audio signal;

a Hilbert filter for producing a copy of said secondary audio program information with a phase shift;

a delay module for delaying said secondary audio program information to produce a delayed copy of said secondary audio program information, wherein said delay module is capable of applying a non-unity delay to said secondary audio program information to produce said delayed copy of said secondary audio program information; and an FM demodulator for demodulating said secondary audio program information using a delay from said delay module and a discrete time index with a combination of said copy of said secondary audio program information with a phase shift and said delayed copy of said secondary audio program information to produce an FM demodulated signal.

2. The system of claim 1, further comprising an automatic gain control for normalizing amplitude of an FM carrier signal at said FM demodulator.

3. The system of claim 1, further comprising a lowpass filter for eliminating noise from said FM demodulated signal.

4. The system of claim 1, wherein said bandpass filter comprises a Finite Impulse Response filter.

5. The system of claim 1, wherein said bandpass filter comprises a 32-tap Finite Impulse Response filter.

6. The system of claim 1, wherein said Hilbert filter comprises an 11-tap Hilbert filter.

7. The system of claim 1, wherein said Hilbert filter produces a copy of said secondary audio program information with a 90 degree phase shift.

8. The system of claim 1, wherein said FM demodulator uses a simplified approximation for simplified demodulation of said secondary audio program information.

9. The system of claim 1, wherein said FM demodulator produces said FM demodulated signal using $I(n)*Q(n-d)-Q(n)*I(n-d)$, wherein $I(n)$ represents said delayed copy of said secondary audio program information, $Q(n)$ represents said copy of said secondary audio program information with a phase shift, d represents a non-unity delay, and n represents a discrete time index.

10. The system of claim 9, wherein d is 2.

11. A method for demodulation of a digital signal, said method comprising:

isolating desired signal information from an audio signal;

phase shifting a copy of said desired signal information to produce a phase shifted copy of said desired information;

delaying a copy of said desired signal information using a non-unity delay to produce a delayed copy of said desired signal information; and FM demodulating said desired signal information using said non-unity delay and a discrete time index with a combination of said phase shifted copy of said desired signal information and said delayed copy of said desired signal information to produce an FM demodulated signal.

12. The method of claim 11, further comprising normalizing amplitude of an FM carrier signal at said FM demodulator.

13. The method of claim 11, further comprising eliminating noise from said FM demodulated signal.

14. The method of claim 11, wherein said phase shifting step produces a copy of said desired signal information with a 90 degree phase shift.

15. The method of claim 11, wherein said FM demodulation step uses a simplified approximation for easy demodulation of said desired signal information.

16. The method of claim 11, wherein said FM demodulation produces said FM demodulated signal using $I(n)*Q(n-d)-Q(n)*I(n-d)$, wherein $I(n)$ represents said delayed copy of said desired signal information, $Q(n)$ represents said copy of said desired signal information with a phase shift, d represents a non-unity delay, and n represents a discrete time index.

17. The method of claim 16, where d is 2.

18. A method for simplification of secondary audio program signal demodulation, said method comprising:

using a bandpass filter to isolate said secondary audio program signal in a composite audio signal;

using a Hilbert filter to produce a signal in phase quadrature;

using a delay module to produce a delayed secondary audio program signal using a delay, wherein said delay module is capable of applying a non-unity delay to said secondary audio program signal to produce said delayed secondary audio program signal; and using a simple approximation for FM demodulation of said secondary audio program signal based on said delay, a time index, said delayed secondary audio program signal, and said signal in quadrature phase.

19. The method of claim 18, further comprising using automatic gain control to normalize carrier amplitude in said FM demodulation.

20. The method of claim 18, further comprising using a lowpass filter with a minimal number of coefficients to eliminate noise in said FM demodulated signal.

21. The method of claim 18, wherein said simple approximation comprises $I(n)*Q(n-d)-Q(n)*I(n-d)$, wherein $I(n)$ represents a delayed copy of said secondary audio program signal, $Q(n)$ represents a copy of said secondary audio signal with a phase shift, d represents a non-unity delay, and n represents a discrete time index.

* * * * *

UNITED STATES PATENT AND TRADEMARK OFFICE

CERTIFICATE OF CORRECTION

PATENT NO. : 7,650,125 B2
APPLICATION NO. : 11/286561
DATED : January 19, 2010
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twenty-third Day of November, 2010

David J. Kappos
*Director of the United States Patent and Trademark Office*